United States Patent [19]

Tarney et al.

[11] 3,860,505

[45] Jan. 14, 1975

[54] ETHYLENE/$C_3$-$C_8$ ALPHA-OLEFIN ELASTOMERS HAVING IMPROVED BUILDING TACK

[75] Inventors: Robert Edward Tarney, Hockessin; John J. Verbanc, Wilmington, both of Del.

[73] Assignee: E. I. Du Pont de Nemours and Company, Wilmington, Del.

[22] Filed: Aug. 12, 1970

[21] Appl. No.: 63,261

Related U.S. Application Data

[63] Continuation-in-part of Ser. No. 774,494, Nov. 8, 1968, Pat. No. 3,565,841, which is a continuation-in-part of Ser. No. 708,486, Feb. 27, 1968, abandoned.

[52] U.S. Cl..... 204/159.12, 204/159.14, 204/159.2, 260/4, 260/27, 260/845, 260/846, 260/848, 260/888, 260/896

[51] Int. Cl.................................................. B01j 1/10
[58] Field of Search....... 204/159.12, 159.14, 159.2; 260/4, 27, 845, 846, 848, 888, 896

[56] References Cited
UNITED STATES PATENTS

| | | | |
|---|---|---|---|
| 3,565,041 | 2/1971 | Tainey et al............................ | 119/3 |
| 3,616,362 | 10/1971 | Soldatos......................... | 204/159.14 |

*Primary Examiner*—Donald E. Czaja
*Assistant Examiner*—W. E. Parker

[57] ABSTRACT

An ethylene/$C_3$-$C_8$ alpha-olefin elastomer is tackified by uniformly dispersing therein an organic cyclic resin, which has at least one polar functional group and a molecular weight of at least 200 and exposing the surfacae of the resulting mixture to ultraviolet light in the presence of oxygen or to ozone.

11 Claims, No Drawings

ETHYLENE/$C_3$–$C_8$ ALPHA-OLEFIN ELASTOMERS HAVING IMPROVED BUILDING TACK

PRIORITY

This application is a continuation-in-part of application Ser. No. 774,494, filed Nov. 8, 1968 now U.S. Pat. No. 3,565,841, which is a continuation-in-part of application Ser. No. 708,486, filed Feb. 27, 1968 now abandoned.

BACKGROUND OF THE INVENTION

Synthetic rubber-like polymers are notably deficient in building tack, which is the surface property of natural rubber which enables two pieces of unvulcanized stock to adhere when brought into contact under moderate pressure. Surprisingly enough this characteristic is peculiar to two pieces of natural rubber and neither will adhere to other substances in a like manner; for example, such adhesion does not exist between natural rubber and metal, glass or wood. Unfortunately synthetic ethylene/$C_3$–$C_8$ alpha-olefin rubber-like polymers do not exhibit good building tack and the various means heretofore devised to overcome this deficiency, including the addition of natural rubber, synthetic resins or natural products such as rosins or gums during the compounding operation are not satisfactory. Prior attempts to improve building tack of elastomers generally and ethylene/$C_3$–$C_8$ alpha-olefin elastomers in particular have concentrated upon use of one or more adhesive layers to hold the polymer layers together in a sandwich-like structure. There has been a need for a means for improving the building tack of ethylene/$C_3$–$C_8$ alpha-olefin elastomers without any need to resort to stratified structures or the additional step, inherent in making such structures, of coating adhesive on the layers to be adhered.

THE INVENTION

In accordance with this invention an elastomeric ethylene/$C_3$–$C_8$ alpha-olefin copolymer is provided with excellent building tack by uniformly dispersing therein an organic resin which has at least one polar functional group and a molecular weight of at least 200 and exposing the surface of the resulting mixture to an activating agent, such as ozone or ultraviolet light in the presence of oxygen to produce a peel tack which is at least 1 pound per lineal inch more than the peel tack of the mixture before exposure.

DETAILS OF THE INVENTION

The term "building tack" (sometimes referred to herein simply as "tack") is used herein with its usual meaning as the peculiar characteristic of natural rubber which causes two fresh surfaces to adhere or coalesce. The amount of tack which an elastomer has is determined by a so-called "peel test" or "repeat test" described hereinafter.

The organic cyclic resins useful in this invention are in general isoprenoid resins, terpenoid resins or heat insensitive phenol-aldehyde resins or other compounds or resins with a molecular weight of at least about 200 and having similar functional groups and properties. The cyclic resins useful in this invention contain at least one polar functional group. The latter can be attached directly to a ring carbon or an alicyclic carbon atom or be part of a ring. Representative polar functional groups include an ethylenically unsaturated group (C=C), hydroxyl (—OH), ester (—COOR), carboxy (—COOH), amide (—CONH$_2$), amine (—NH$_2$), cyanide (—CN), thiol (—SH), aldehyde (—CHO), OXO (=O), carbonyl

and the like. The cyclic resins include condensation products such as phenol-aldehyde resins and compounds with polycyclic rings as in abietic acid and derivative thereof. R is aliphatic or aromatic.

The terpenoid resins useful in this invention include terpenes, rosins, modified rosins and derivatives of these which meet the criteria set forth above. The class of modified rosins includes hydrogenated and partially hydrogenated rosins, aromatized and polymerized rosins and derivatives thereof, containing one or more or a combination of the polar functional groups mentioned above. In such compounds the normal functional groups can be replaced with one of the functional polar groups mentioned above (e.g., abietic acid in which the carboxy group is substituted by a hydroxyl group). Resin acids which are useful tackifiers include abietic acid, neoabietic acid, dehydroabietic acid, dihydroabietic acid, tetrahydroabietic acid, levo pimaric acid, dextro pimaric acid and isodextro pimaric acid. Dimers and derivatives of these acids containing one or more of the above functional groups, particularly the esters, can also be used.

The isoprenoid compounds useful in this invention include resinous polymers such as the Diels-Alder reaction product of isoprene with piperylene, butadiene, dicyclopentadiene or combinations thereof, the polymerization being conducted with an acid catalyst. Such polymers modified by introduction of one or more of the above-mentioned polar functional groups are preferred and carboxylated, hydroxylated and phenolated derivatives of such polymers are especially preferred. Commerical polymers which can be so modified include Wingtack 95 and Betaprene H, sold by Goodyear Tire and Rubber Company and Reichhold Chemical Company, respectively. Although phenol-aldehyde resins generally are useful, phenol-formaldehyde resins meeting the above criteria are particularly preferred.

An especially useful isoprenoid resin is an interaddition polymer of an isoprenoidal codimer, as exemplified by an interdimer of isoprene and allylicly terminated cyclopentadiene, wherein the isoprenoidal codimer is about 50–90% of the final copolymer by reason of reaction (termination) with 2-methyl-butene or alpha-methyl-styrene in an amount at least equal to the amount of cyclodienes present.

In addition to the cyclic resins which appear in the examples, the following specific compounds are also useful in this invention:

Levo pimaric acid modified with maleic anhydride.
Levo pimaric acid modified with fumaric acid.

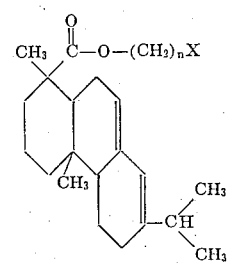

where x = —OH, —COOH, —CONH$_2$, —CONR$_2$

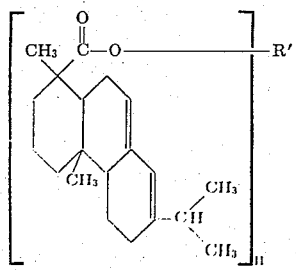

where $n$ = the valence of R', and R' is CH$_3$—, C$_2$H$_5$—; CH$_2$=CH—CH$_2$—, phenyl, cyclohexyl, —CH$_2$—CH$_2$—, —CH$_2$—CH$_2$—CH$_2$—, $$-CH_2-\underset{\underset{CH_2-}{|}}{\overset{\overset{CH_2}{|}}{C}}-CH_2-$$

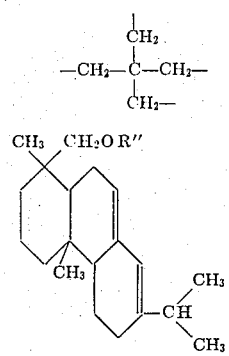

where R'' = H, CH$_3$, C$_2$H$_5$, CH$_2$=CH—CH$_2$—, phenyl, cyclohexyl

Hydroabietyl alcohol and its esters.

Resin acids modified by reaction with phenolic resins in accordance with the following type reaction:

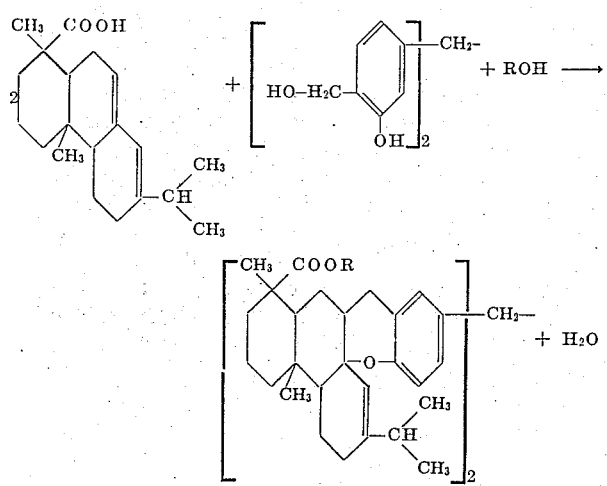

where R is an aliphatic or aromatic group.

Terpene phenolic resins, oil soluble (e.g., resin sold as Durez 12603)

Hydroxylated petroleum hydrocarbon resin (e.g., hydroxylated Piccopale Resin)

Zinc, aluminum and other heavy metal salts of the resins mentioned above, and which are known as resinates, are also useful in this invention.

The phenol-aldehyde resins useful in this invention are heat-insensitive in the sense that they are stable to change under the conditions of incorporation into the elastomer and its ultimate use.

Particularly preferred resins are the ethylene glycol ester of polymerized rosin and carboxylated, hydroxylated or phenolated derivatives of resinous polymers of the Diels-Alder reaction of isoprene with piperylene, butadiene, dicyclopentadiene or combinations thereof.

The cyclic resins of this invention are incorporated into the hydrocarbon polymers in amounts of about 1–50 phr. (parts resin per hundred parts polymer by weight) and preferably in an amount of 2–10 phr. It is desirable to use as little cyclic resin as will provide the desired tack for economic reasons and to avoid adverse affects on curability of the polymer.

This invention is applicable to elastomeric ethylene/C$_3$–C$_8$ alpha-olefin copolymers. Suitable alpha-olefins include, for example, propylene, 1-butene, 1-pentene, 1-hexene, 1-heptene, 1-octene, 4-methyl-1-pentene, 4,4-dimethyl-1-pentene, 4-methyl-1-hexene, 4,4-dimethyl-1-hexene, 5-methyl-1-hexene, 4-methyl-1-heptene, 5-methyl-1-heptene, 6-methyl-1-heptene. Propylene is a preferred alpha-olefin. It is preferred that the copolymers exhibit no crystallinity to the x-ray. This invention is also applicable to ethylene/C$_3$–C$_8$ alpha-olefin copolymers in combination with natural rubber, butadiene/styrene polymers, butadiene polymers, isobutylene polymers and combinations thereof.

The compositions of the present invention are made by mixing the elastomer and cyclic resin in any convenient manner which will produce a uniform mixture. This can be accomplished by milling on a conventional rubber mill or in a Banbury mixer. Normally the cyclic resin will exhibit significant affinity for the polymer and this facilitates the mixing which is usually accomplished in a manner of minutes. Conveniently the cyclic resin can be added to the polymer during the regular compounding operation wherein one or more other additives, curing agents, antioxidants, pigments, etc. are added. The latter are not necessary, however, to gain the advantages of this invention although it is preferred that the compositions of this invention include reinforcing fillers such as carbon black.

Typical reinforcing fillers which can be employed include, for example, Super Abrasion Furnace carbon black, Intermediate Abrasion Furnace carbon black, High Abrasion Furnace carbon black, Fast Extruding Furnace carbon black, Semi-Reinforcing Furnace carbon black, Easy Processing Channel carbon black and Medium Thermal carbon black. Curing is effected by conventional methods and under the usual conditions.

One of the benefits of this invention, beyond the development of exceptional building tack in polymers which heretofore have resisted exhibiting this property, is the substantial greater plasticity of the polymer/resin mixture compared to the polymer alone. Compositions used heretofore to impart building tack to ethylene/C$_3$–C$_8$ alpha-olefin polymers have actually reduced plasticity of the polymer and rendered it relatively less workable whereas the present polymer/resin compositions are more workable than the polymer alone. Thus, whereas in the past it has been necessary to plasticize ethylene/C$_3$–C$_8$ alpha-olefin polymers with oils and other agents to improve polymer workability, the present cyclic resins are plasticizers also.

Comparative plasticities are easily determined by Wallace Plasticity measurements. These are made on a Wallace Plastimeter, manufactured by H. W. Wallace & Company, Ltd., London, and is a measure of the amount of flow or deformation under load of unvulcanized elastomeric materials. In this measure the polymer to be tested is sheeted and cut into pellets having a thickness in the range 125 mils to 300 mils. Initially, for a 10-second period, the test pellet is compressed to exactly 1 mm. in thickness and is heated to 100°C. Then the test pellet is subjected to a 10-kg. load for exactly 15 seconds at 100°C.

After mixing the elastomer and cyclic resin, the elastomer/resin mixture is activated, preferably by exposure to ozone; or to ultraviolet light (UVL) in the presence of oxygen, under controlled conditions. Ozone is a preferred activating agent. Exposure to ultraviolet light, particularly ultraviolet light filtered through ordinary window glass, is also very effective. The mixture is in contact with air or oxygen during the exposure to ultraviolet light.

Too much exposure to the activating agent can prevent the generation of building tack in the elastomer mixture and can even reduce the tack inherent in the elastomer itself. Too little exposure prolongs the time necessary to impart the desired tack. The correct exposure for a particular stock and exposure period can easily be determined by trial tests. The time of exposure varies inversely with the intensity of the treatment. Care is advisable because an excessive exposure period can destroy the tack initially produced by an otherwise acceptable exposure. Bright sunlight filtered through ordinary window glass is an acceptable source of UVL and normally requires an exposure of 4–8 hours although in certain cases 2 hours or even somewhat less provides acceptable tack. Fluorescent light is another acceptable light source. Generally more than 12 hours exposure to bright sunlight at 75°N. latitude will not be necessary and 8 hours is routinely satisfactory for adequate tack generation. One half-hour exposure to light from an ultraviolet light lamp filtered through ordinary window glass provides sufficient activation of the elastomer/cyclic resin mixture to produce adequate tack. On the other hand a few seconds exposure to ozone (in the dark or in daylight or other) at a concentration of 100 parts ozone per million parts air imparts excellent tack.

In place of ozone or UVL as the activating agent for generating tack in the elastomer mixture other methods can be used, such as spark discharge or flame treatments. Preferably the agent is used in a manner which will provide only surface treatment of the elastomer/resin mixture and usually the latter is made into sheet form to facilitate such surface treatment. Exposure time will vary with the activating agent used. Exposure to ozone, or to daylight in presence of oxygen or air, is the least expensive method of activation although the use of UVL lamps in the presence of oxygen is practical.

Regardless of the way in which cyclic resin is incorporated, the period and intensity of exposure to activating agent is regulated to provide at least one pound per linear inch peel tack more than the peel tack of the elastomer without activation.

It has been observed that frequently improved results are obtained when the elastomer/resin composition is aged prior to activation. Therefore, it is a preferred embodiment of the present invention that following uniformly mixing the elastomer and cyclic resin, the mixture be aged by simply storing the mixture in a place where it is exposed to minimal ozone or ultraviolet light (e.g., in a dark room). Aging is conducted for a period long enough to permit formation of a concentration gradient such that the concentration of resin is greater at the surface of the elastomer/resin composition than in the interior of the composition.

The appearance of a concentration gradient can be detected by Total Reflectance Infra-red Spectroscopy which will show a change in proportions of the mixture components in local areas.

The minimum aging period necessary for the formation of a concentration gradient will vary with the particular polymer composition, tackifier, and other additives and conditions, particularly oils, temperature, etc. It is important that the resin on the surface be in an amorphous (plasticized) condition rather than crystalline. A candidate resin which readily crystallizes on the surface of the elastomer/resin mixture after aging is not useful in this invention.

The following example illustrates the invention. All parts, percentages and proportions are by weight unless otherwise indicated.

The polymer used in the example is an EPM polymer, that is, an ethylene/propylene polymer, made by copolymerizing ethylene with propylene in the presence of a preformed coordination catalyst prepared by mixing $VOCl_3$ and diisobutylaluminum monochloride in accordance with the general procedures of U.S. Pat. No. 2,933,480 to Gresham and Hunt. The polymer has a Mooney viscosity (ML 1+8/100°C.) of 40 and contains 43 weight percent ethylene monomer units and 57 weight percent propylene monomer units.

Resin R, used in the example, is an oil soluble, thermoplastic resin which is made by reacting slightly more than a mole of a branched p-1,1,3,3-tetramethylbutyl substituted phenol with a mole of formaldehyde in the presence of acid. Resin R melts in the range 65°–75°C. and has a hydroxyl equivalent of 197. Analysis (by weight): 81.6% C; 10.3% H; 8.28% O.

PREPARATION OF COATED FABRIC FOR TIRE CARCASS

Preparation of Dipping Composition

A. Preparation of Chlorosulfonated Polyethylene Latex

A chlorosulfonated polyethylene is selected containing about 20% chlorine and 1% sulfur. A 12.5% solids solution is prepared by dissolving this chlorosulfonated polyethylene and 0.1 phr. (parts per 100 parts of polymer) dinitrotoluene in an 88/12 benzene/isopropanol mixture. Two parts of this solution are then added to one part of water containing 8 phr. of sodium alkyl benzene sulfonate ("Nacconol NRSF") and 0.25 phr. of sodium nitrate in a high shear mixer at 80°C. Solvent is removed from the resulting emulsion with steam at atmospheric pressure to give a latex. After 0.8 part of ammonium alginate has been added for each 100 parts of latex solids, the composition is allowed to cream by standing for several days at room temperature. Typically, a 47.7% solids latex results.

B. Preparation of Emulsifier

10 Parts of "Kenflex A-36" and 1 part of oleic acid are mixed, warmed to 100°C. and added to 0.6 part of triethanolamine and 13.4 parts of water. The emulsifier is made by agitating this mixture in a homogenizer. Kenflex A-36 resin is a polymerized aromatic petroleum resin (made by Kenrich Petrochemicals, Inc.) having a melting point of 80°C. and a specific gravity of 1.086.

C. Preparation of Dipping Composition

13 Parts of resorcinol and 14.4 parts of 37% formaldehyde are dissolved in 75 parts of water; then 200 parts of the latex prepared in paragraph (A) above and 25 parts of the emulsifier are added with the stirring.

The resulting composition is diluted with 315 parts of distilled water. The pH is about 7.5. The solids content is about 18.8% and may generally be in the range of about 20 ±3%. In general this dip is aged at room temperature about 2–3 days. The pH should be about 6.7.

Carcass Fabric

Carcass fabric composed of 210 filament, 2-plied, 1260 denier nylon 66 tire cord is used.

Application of Adhesives to Carcass Fabric

This fabric, moving at the rate of 25 yards/minute, is dipped once by standard techniques in a composition having the formula listed below to obtain a 43 mil (gauge) ply fabric.

| Dip Formulation | Pounds |
| --- | --- |
| Water | 75 |
| Resorcinol | 13 |
| Formaldehyde (37%) | 14.4 |
| Chlorosulfonated Polyethylene Latex | 200 |
| Emulsifier | 25 |
| Water | 315 |

It is then stretched 10% while being dried at 445°F. for 0.8 minute.

| Standard Ingredients for 100 Parts of Polymer in Carcass Skim Stock | |
| --- | --- |
| APF carbon black (a high structure furnace black having an EM (electron microscope) surface area of about 49 square meters per gram and a DBF (dibutyl phthalate absorption number by ASTM Test D 2414-65T) absorption of about 127 cc/100 grams) | 75 |
| Sunpar 2280 Oil (a paraffinic petroleum oil, ASTM type 104B, SUS (Saybolt Universal Viscosity by ASTM Test D88) viscosity 100°F./210°F.=2907/165; 23.5% total aromatics) | 40 |
| Zinc oxide | 5 |
| Dicumyl peroxide | 2.0 |
| Stearic acid | 1.0 |

Processing

A. Mixing Carcass Skim Stocks

Carbon black, petroleum oil and resin can be added to polymer on a conventional rubber roll mill or in an internal mixer such as a Banbury Model OOC or Model 11 Mixer.

In a typical mill mixing procedure, polymer is banded on a mill cooled with 40°C. water, carbon black and petroleum oil are added, and the resulting masterbatch is mixed for 10 minutes to get a good dispersion. When solid resin is to be added, the mill is first heated to 150°C.; the resin melts and is adequately dispersed after 3–5 minutes additional mixing. In any case, stearic acid, zinc oxide, and the curing ingredients are added to the masterbatch on a 40°C. mill, followed by 6 cigar-rollings to finish the mixing process and produce the desired carcass skim stock.

In a typical internal mixing procedure, polymer and stearic acid are charged into a water-cooled No. 11 Banbury operated at a speed of 40 rpm and a ram pressure of 100 psi. Carbon black and petroleum are added in increments, the temperature being kept at about 235°F. After about 4–5 minutes mixing time, resin is introduced. Mixing continues for about 1–2 more minutes. The masterbatch is dumped (Banbury temperature 280°–300°F.) and compounded with zinc oxide and the curing ingredients on a 40°C. rubber roll mill to make the desired carcass skim stock. A similar skim stock is made if the resin is added ahead of the black and oil or if half the black is added to the polymer, followed by the oil, the other half of the black, and the resin.

Preparation of Rubberized Carcass Fabric

For test purposes, only one side of the treated nylon fabric described hereinbefore need be coated with carcass skim stock. Typically that step is done on an Adamson United calender having 3 rolls each 20 inches long and 8 inches in diameter; the top and bottom rolls are at 180°F.; the center roll is at 170°F.; the friction value is 1.22.

Banbury-mixed carcass skim stock travels from a 160°F. warm-up mill to the upper calender nip and thence to the lower calender nip where it is pressed against the nylon fabric described above. A 0.010–0.015-inch laye of skim stock is deposited. The resulting rubberized carcass fabric is wrapped in polyethylene at the end of the calender train.

Carcass fabric, coated on each side with the carcass skim stock, is made in a similar way by one pass through a conventional 4-roll calender.

The following tests are used to determine the amount of tack in the elastomer illustrated in the Example.

Peel Tack

Test samples are formed by pressing a 6 × 3 × 0.75 inch sheet of elastomeric material between a cotton duck backing and a polyethylene terephthalate film, to embed the cotton duck in one face, using a laboratory compression molding press, with mild pressure at a temperature of 100°C. for 3 minutes. Test strips one-fourth inch wide are cut from the backed sheet, the film is removed, and pairs are joined by placing the elastomeric surfaces together and rolling with an 8-pound weight. Thirty seconds after joining the strips they are pulled apart in a tensile testing machine at a draw rate of 2.5 inches per minute at 20°–25°C. The peel strength is recorded in pound per linear inch.

Hold Tack

This is a measure of tack bond in tensile loading (quick grab tack). Specimens are cut from either (a) the carcass fabric in 1 × ½ inch strips with the cords parallel to the long axis or (b) from fabric constructed as described under the Peel Test. One piece is mounted vertically on the face of a fixed metal block. The other piece is mounted horizontally across a similar block which can be driven into contact with the first block by an air activated cylinder. When the faces of the pieces are contacted, the contact force is measured by the pressure applied to the air cylinder. A contact force of 20 pounds is used. The time of contact is determined by a timing mechanism which can be set for an interval of 0.8 to 15 seconds. A contact time of one second is used followed by application of a 5-pound breaking force. The time at which the surfaces separate is recorded up to a maximum of 600 seconds as a measure of the degree of hold tack.

Activation of the Carcass Fabric

Ozone exposure of carcass fabric is done continuously using a continuous ozonator.

EXAMPLE

Carcass fabrics are made in accordance with the above-described general procedures using skim stocks containing EPM polymer. The Standard Ingredients are added to the stock used in this Example. Then 10 phr.

Resin R is incorporated into the stock. For purpose of comparison, stocks are made without Resin R.

In each case, the polymer surface of the carcass is exposed, almost immediately after incorporation of the Resin, to 125 ppm. ozone ($O_3$) for a given period of time and tested for peel and hold tack by the general procedures described above. Conveniently ozone exposure is conducted at room temperature. Typical test data are given below:

| Length of Ozone Exposure (Seconds) | Sample | Initial | 1 Day | 7 Days | 30 Days | 60 Days |
|---|---|---|---|---|---|---|
| | | Peel Tack in Pounds Per Linear Inch | | | | |
| 60 | Polymer | 2 | 2 | 2 | 2 | 2 |
| 60 | Polymer + Resin R | 11 | 14 | 9 | 8 | 8 |
| 10 | Polymer | 2 | 2 | 2 | 2 | 2 |
| 10 | Polymer + Resin R | 5 | 5 | 5 | 2 | 2 |
| | | Hold Tack (In Seconds) | | | | |
| 10 | Polymer | 6 | 4 | 2 | <1 | <1 |
| 10 | Polymer + Resin R | 395 | 600 | 69 | >600 | >600 |
| 60 | Polymer | 28 | 16 | 3 | <1 | <1 |
| 60 | Polymer + Resin R | 600 | 600 | >600 | >600 | >600 |

Similar results are obtained when the following resins, for example, are employed:

Dehydrogenated rosin (Stabelite)[1]
Nancy wood rosin
Polymerized rosin (40% dimer) m.p. 102°C. (Polypale resin)[2]
Dimerized rosin m.p. 152°C. Acid-No. 140 (Dymerex)[1]
Methyl ester of rosin (Abalyn)[1]
Triethylene glycol ester of dehydrogenated rosin (Staybelite No. 3)[2]
Diethylene glycol ester of rosin (Flexalyn 80M)
Ethylene glycol ester of polymerized rosin (Polypale Ester No. 1)[1]
Glycol ester of dehydrogenated rosin (Staybelite Ester No. 5)[1]
Glycerol ester of dehydrogenated rosin (Staybelite Ester No. 10)[1]
Glycerol ester of rosin S.P. 91°C. (Ester Gum 8D)[1]
Ethylene glycol ester of polymerized rosin (Polypale Ester No. 10)[1]
Pentaerythritol ester of hydrogenated rosin (Pentalyn H)[1]
Dehydroabietyl amine acetate (Rosin amine D acetate)[1]
Cyclic resin ZXRP 3536[2]
Piccolyte Alpha 115 (Terpene resin)[3]
Hydroxylated isoprenoid polymer (hydroxylated Wingtack 95)
Carboxylated isoprenoid polymer (carboxylated Wingtack 95)
Phenolated isoprenoid polymer (phenolated Wingtack 95)[4]

[1] Hercules Powder Company
[2] Union Carbide Company  [3] Pennsylvania Industrial Chemical Corporation
[4] Goodyear Tire and Rubber Company

We claim:
1. An elastomeric copolymer of ethylene and a ($C_3$–$C_8$) alpha-olefin tackified by
   a. uniformly dispersing therein an organic cyclic resin having at least one polar functional group and a molecular weight of at least 200, said resin being terpenoid resins which are terpenes, rosins, or modified rosins, and
   b. exposing the surface of the resulting mixture to ultraviolet light in the presence of oxygen or to ozone to produce a peel tack which is at least one pound per linear inch more than the peel tack of the mixture before exposure.

2. The composition of claim 1 in which the alpha-olefin is propylene.

3. The composition of claim 1 wherein about 1–50 parts of organic cyclic resin are employed per 100 parts ethylene/alpha-olefin elastomer.

4. The composition of claim 1 wherein the resin is an ethylene glycol ester of polymerized rosin.

5. The composition of claim 1 having incorporated therein a reinforcing filler.

6. The composition of claim 5 in which the alpha-olefin is propylene.

7. The composition of claim 6 wherein the resin is an ethylene glycol ester of polymerized rosin.

8. The composition of claim 7 wherein about 1–50 parts of resin are employed per 100 parts ethylene/propylene elastomer.

9. The composition of claim 1 wherein the ethylene/alpha-olefin copolymer is in a mixture containing at least one of natural rubber, butadiene/styrene polymer, butadiene polymer, isobutylene polymer.

10. The composition of claim 9 in which the alpha-olefin is propylene.

11. The composition of claim 1 wherein, prior to exposure to ultraviolet light or ozone, the elastomer/resin mixture is aged until a concentration gradient is formed whereby the concentration of resin is greatest at the surface of the mixture.

* * * * *